(12) United States Patent
Juan et al.

(10) Patent No.: US 8,922,500 B2
(45) Date of Patent: Dec. 30, 2014

(54) PROJECTIVE CAPACITIVE TOUCH SENSOR

(75) Inventors: Yi Chung Juan, Tainan County (TW);
Chao Hui Wu, Kaohsiung County (TW);
Hung Chang Chang, Taichung County (TW)

(73) Assignee: Hannstar Display Corp., Taipei County (TW)

( * ) Notice: Subject to any disclaimer, the term of this patent is extended or adjusted under 35 U.S.C. 154(b) by 1120 days.

(21) Appl. No.: 12/899,816

(22) Filed: Oct. 7, 2010

(65) Prior Publication Data

US 2011/0102366 A1    May 5, 2011

(30) Foreign Application Priority Data

Oct. 30, 2009   (TW) ............................... 98136810 A (51) Int. Cl.
*G06F 3/041*      (2006.01)
*G06F 3/044*      (2006.01)
(52) U.S. Cl.
CPC ..................................... *G06F 3/044* (2013.01)
USPC ........................................................ 345/173
(58) Field of Classification Search
USPC .................................................. 345/173–184
See application file for complete search history.

(56) References Cited

U.S. PATENT DOCUMENTS

| | | | |
|---|---|---|---|
| 5,869,791 A * | 2/1999 | Young ........................ | 178/20.01 |
| 6,297,811 B1 | 10/2001 | Kent et al. | |
| 2008/0007534 A1 | 1/2008 | Peng et al. | |
| 2008/0309633 A1 * | 12/2008 | Hotelling et al. ............. | 345/173 |
| 2009/0128518 A1 | 5/2009 | Kinoshita et al. | |
| 2009/0160824 A1 * | 6/2009 | Chih-Yung et al. ........... | 345/175 |
| 2010/0007628 A1 * | 1/2010 | Eriguchi et al. .............. | 345/174 |
| 2011/0175671 A1 * | 7/2011 | Reynolds ...................... | 327/517 |

FOREIGN PATENT DOCUMENTS

| | | |
|---|---|---|
| TW | 200611287 A | 4/2006 |
| TW | 200923746 A | 6/2009 |

\* cited by examiner

*Primary Examiner* — Yong H Sim
(74) *Attorney, Agent, or Firm* — Lowe Hauptman & Ham, LLP (57) ABSTRACT

A projective capacitive touch sensor includes a substrate, a plurality of electrode layers and a plurality of dielectric layers. The electrode layers are arranged on the substrate along a first direction. At least one dielectric layer is formed on each electrode layer and the dielectric layer has different widths along a second direction.

15 Claims, 6 Drawing Sheets

$$C_1 = \frac{\varepsilon_1 A_1}{d}$$

FIG. 3a

$$C_2 = \frac{\varepsilon_2 A_1}{d}$$

FIG. 3b $$C_3 = \frac{\varepsilon_1 A_2}{d}$$

FIG. 3c $$C_4 = \frac{\varepsilon_2 A_3}{d}$$

FIG. 8b

PROJECTIVE CAPACITIVE TOUCH SENSOR

CROSS REFERENCE TO RELATED APPLICATION

This application claims the priority benefit of Taiwan Patent Application Serial Number 098136810, filed on Oct. 30, 2009, the full disclosure of which is incorporated herein by reference.

BACKGROUND

1. Field of the Invention

This invention generally relates to a touch control device and, more particularly, to a projective capacitive touch sensor.

2. Description of the Related Art

With the popularity of the portable device, human-machine interface devices have been broadly adapted to portable devices, such as PDAs, cell phones and note books so as to humanize the operation thereof. And the touch screen plays an important role in humanize operation.

Presently, touch screens can mainly be divided into resistive, capacitive, infrared and SAW touch screens. Because the projective capacitive touch screen will not be deteriorated by moisture and the material of its touch surface has no function in touch detection mechanism, it is more suitably adapted to portable devices operated outdoors.

Figure 1:
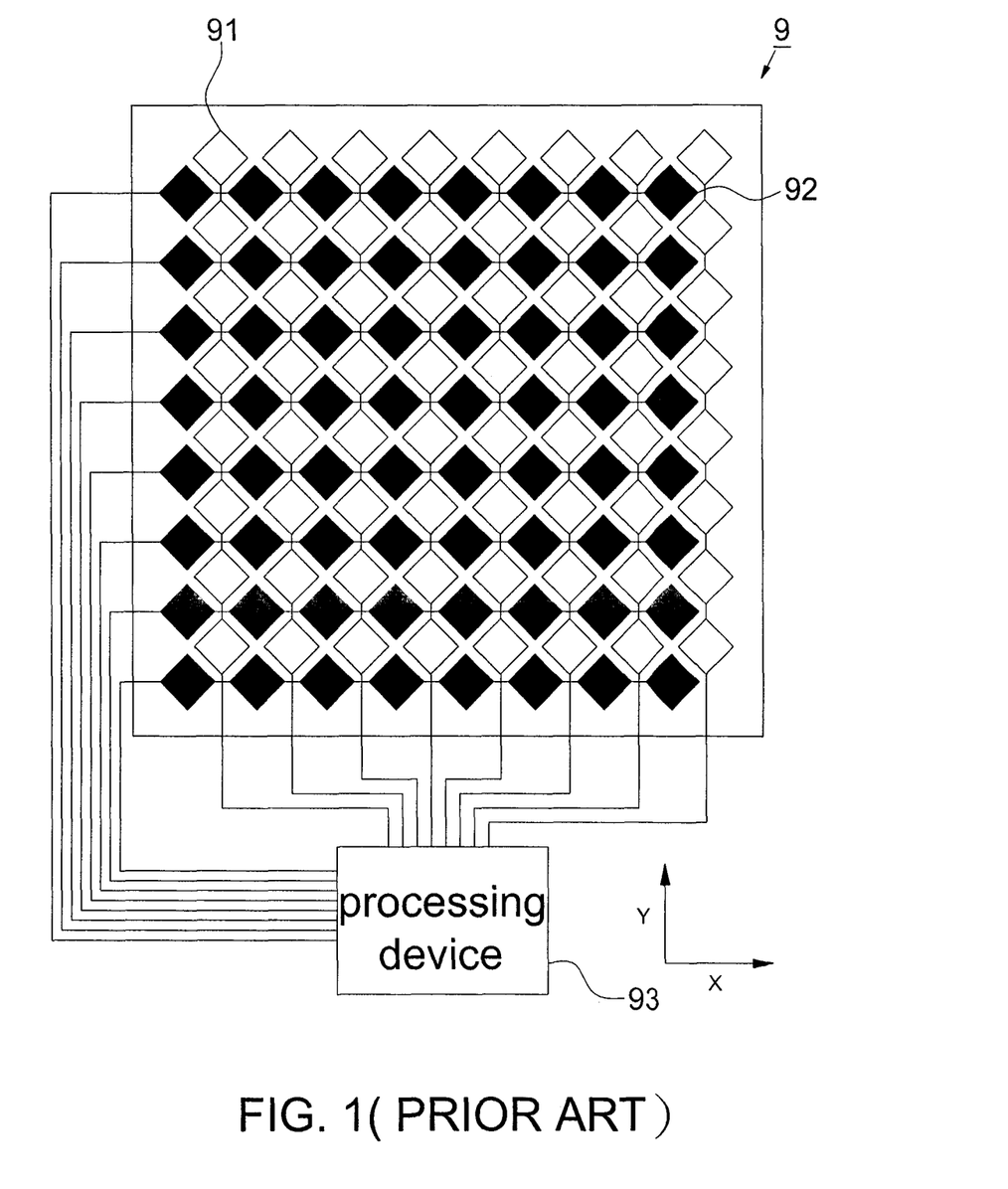
FIG. 1 shows a schematic diagram of the sensor array of a conventional touch-sensor pad.

The projective capacitive touch screen mainly detects the capacitance variation of a touch-sensor pad induced by a conductive object approaching thereto so as to detect a position of the conductive object with respect to the touch screen. For example FIG. 1 shows a sensor array 9 of a conventional touch-sensor pad that includes a plurality of first sensor elements 91 coupled together, a plurality of second sensor elements 92 coupled together and a processing device 93, wherein the first sensor elements 91 and the second sensor elements 92 are coupled to the processing device 93 through conductive traces. The first sensor elements 91 and the second sensor elements 92 are disposed in a repetitive sequence on the sensor array 9 along a moving direction of the conductive object. The processing device 93 respectively calculates capacitance variations of the first sensor elements 91 and the second sensor elements 92 so as to identify a two-dimensional position of the conductive object approaching the sensor array 9. However, the sensor array 9 has a double layer structure thereby requiring more complicated process during manufacturing. Details of the sensor array 9 above can be referred to U.S. Patent Publication No. 2008/0007534.

Accordingly, it is necessary to provide a projective capacitive touch sensor having a single layer of sensing units so as to simplify the manufacturing process thereof.

SUMMARY

The present invention provides a projective capacitive touch sensor that has a single layer of sensing units thereby having a simpler manufacturing process.

The present invention provides a projective capacitive touch sensor that changes the capacitance variation of an electrode layer induced by a conductive object approaching thereto by means of changing areas of dielectric layers or the width of a dielectric layer along a predetermined direction thereby detecting a contact position of the conductive object in that direction.

The present invention provides a projective capacitive touch sensor including a subject, a plurality of electrode layers and a plurality of dielectric layers. The electrode layers are arranged on the substrate along a first direction. A plurality of dielectric layers are formed on each electrode layer and the plurality of dielectric layers formed on each electrode layer have different areas along a second direction.

The present invention further provides a projective capacitive touch sensor including a substrate, a plurality of electrode layers and a plurality of dielectric layers. The electrode layers are arranged on the substrate along a first direction. A dielectric layer is formed on each electrode layer and the dielectric layer formed on each electrode layer has different widths along a second direction.

The present invention further provides a projective capacitive touch sensor including a substrate, a plurality of electrode layers and a plurality of dielectric layers. The electrode layers are arranged on the substrate along a first direction. A dielectric layer is formed on each electrode layer and the dielectric layer formed on each electrode layer includes through openings with different areas along a second direction.

In the projective capacitive touch sensor of the present invention, each electrode has a substantially identical width along the second direction. The plurality of dielectric layers formed on each electrode layer have different areas along the second direction, or the dielectric layer formed on each electrode layer has different widths along the second direction, or the dielectric layer formed on each electrode layer includes through openings with different areas along the second direction. In addition, a plurality of slits may further be formed on the electrode layer so as to increase resolution of the position identification, e.g. more silts may be formed surrounding the dielectric layer with a smaller area, outside the section of the dielectric layer with a smaller width or inside the through opening with a larger area.

The projective capacitive touch sensor of the present invention further includes a plurality of conductive traces and a processing unit coupled to all electrode layers through the conductive traces. The processing unit identifies the position of a conductive object with respect to the projective capacitive touch sensor along the first and second directions according to a capacitance variation of the electrode layers induced by the conductive object approaching thereto.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

It should be noticed that, wherever possible, the same reference numbers will be used throughout the drawings to refer to the same or like parts.

Figure 2:
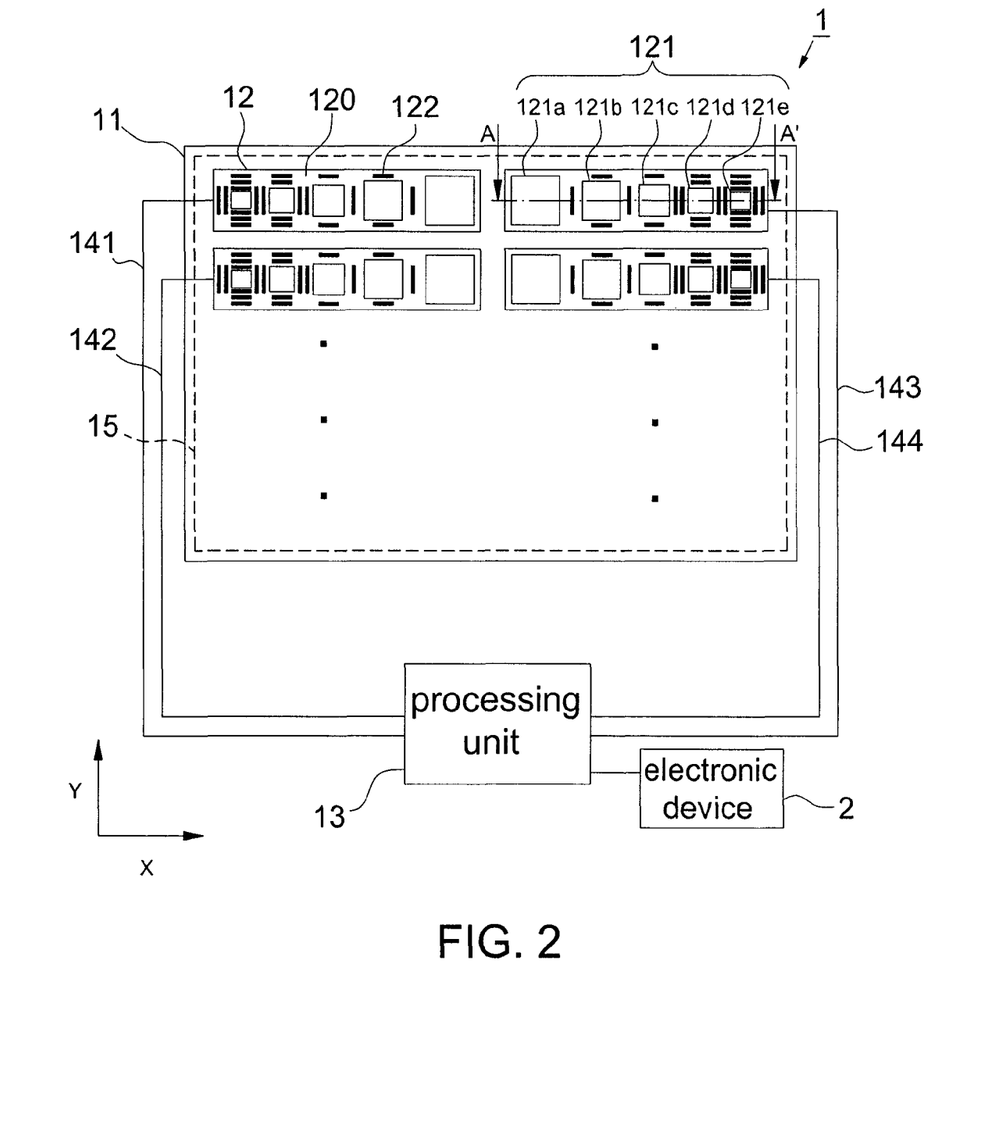
FIG. 2 shows a schematic diagram of the projective capacitive touch sensor according to an embodiment of the present invention that includes a plurality of sensing units.

Please refer to FIG. 2, it shows a projective capacitive touch sensor 1 according to an embodiment of the present invention. The projective capacitive touch sensor 1 includes a substrate 11, a plurality of sensing units 12, a processing unit 13 and a plurality of conductive traces 141-144. The substrate 11 may be formed of glass, polymer film or other suitable material. The sensing units 12 include an electrode layer 120 that may be, for example, but not limited to, a patterned Indium Tin Oxide (ITO) layer, Antimony Tin Oxide (ATO) layer or Fluorine Tin Oxide (FTO) layer. The sensing units 12 may be patterned as a plurality of separated sensing units 12 arranged on the substrate 11 along a first direction (e.g. Y direction) so as to divide a touch zone 15 into different regions along the first direction. The electrode layers 120 preferably have a fixed width along a second direction (e.g. X direction). It is appreciated that, although the sensing units 12 are shown as two columns in FIG. 2, the present invention is not limited to this. The column number of the sensing units 12 may be determined according to the resolution actually required.

The processing unit 13 is coupled to the electrode layer 120 of a sensing unit 12 through the conductive traces 141-144 and is configured to identify the position of a conductive object, e.g. a finger or a touch pen, with respect to the touch zone 15 along a first direction (e.g. Y direction) and a second direction (e.g. X direction) according to a capacitance variation of the electrode layer 120 induced by the conductive object approaching (or contacting) a sensing unit 12. The processing unit 13 may be coupled to an electronic device 2, e.g. a display. The processing unit 13 may control the electronic device 2 to execute corresponding actions according to the identified position of the conductive object. It is appreciated that, numbers of the sensing units 12 and the conductive traces in FIG. 2 are only exemplary and not to limit the present invention.

A plurality of dielectric layers 121, e.g. dielectric layers 121a-121e, with different areas are formed along the second direction on the surface of the electrode layers 120, wherein an area of the dielectric layer 121a is larger than that of the dielectric layer 121b, an area of the dielectric layer 121b is larger than that of the dielectric layer 121c, ...; wherein areas of the dielectric layers 121a-121e are preferably monotonically decreasing or increasing along the second direction. Preferably, the dielectric layers 121 are made of materials having relatively larger dielectric constant, e.g. dielectric constant of 3-4. In this manner, no capacitance (the stray capacitance is ignored herein) is inducted on the electrode layer 120 of any sensing unit 12 when a conductive object does not approach thereto, i.e. the capacitance is zero. When the conductive object approaches different positions of a sensing unit 12 along the second direction, as dielectric layers 121 with different equivalent dielectric constants exist between the conductive object and the electrode layer 120 at different positions, different capacitance variations will be induced.

Figure 3A:
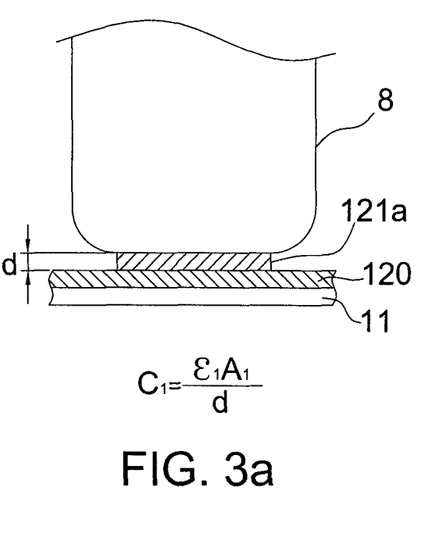
FIGS. 3a-3d show schematic diagrams of a conductive object approaching a sensing unit of the projective capacitive touch sensor according to the embodiment of the present invention.
Figure 3B:
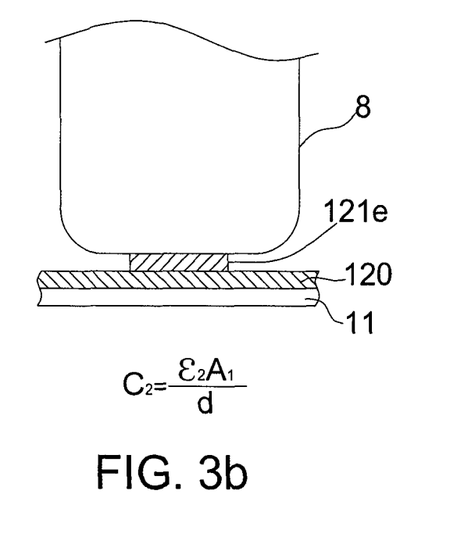

Please refer to FIG. 3a, for example when a conductive object 8 approaches (or contacts) the dielectric layer 121a, a capacitor of value $C_1 = \in_1 A_1/d$ is generated, wherein $\in_1$ is an equivalent dielectric constant of the dielectric layer 121a and the air in the capacitor $C_1$. As the dielectric layer 121 has a relatively larger dielectric constant (e.g. 3-4) herein, the equivalent dielectric constant $C_1$ is relatively larger such that the capacitor $C_1$ has a relatively larger capacitance. In this case, the processing unit 13 is able to detect a relatively larger capacitance variation. Please refer to FIG. 3b, when a conductive object 8 approaches (or contacts) the dielectric layer 121e, a capacitor of value $C_2 = \in_2 A_1/d$ is generated, wherein $\in_2$ is an equivalent dielectric constant of the dielectric layer 121e and the air in the capacitor $C_2$. As the dielectric constant of the air is much smaller than that of the dielectric layer 121e, the equivalent dielectric constant $\in_2$ is relatively smaller such that the capacitor $C_2$ has a relatively smaller capacitance. In this case, the processing unit 13 will detect a relatively smaller capacitance variation, where $A_1$ is an area of the conductive object 8 relative to the electrode layer 120.

Figure 3C:
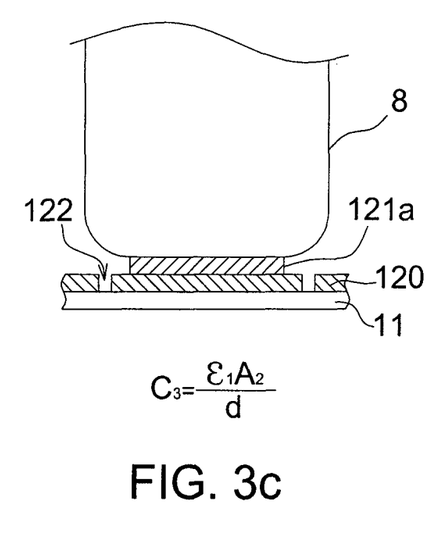
Figure 3D:
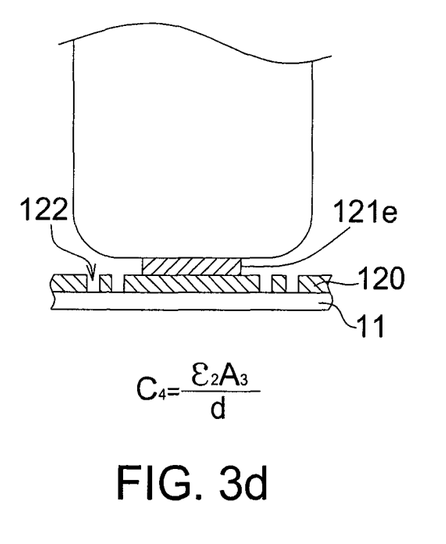

In another embodiment, in order to increase resolution of the processing unit 13 in identifying position, a plurality of slits 122 may further be formed on the electrode layer 120 surrounding the dielectric layers 121, and more slits 122 may be formed surrounding the dielectric layer with a smaller area as shown in FIG. 2, so as to reduce the relative area between the conductive object 8 and the electrode layer 120. Please refer to FIG. 3c, for example when the conductive object 8 approaches (or contacts) the dielectric layer 121a, as the slits 122 are formed on the electrode layer 120, a capacitor of value $C_3 = \in_1 A_2/d$ is generated. Herein, as $A_2 < A_1$, the capacitance $C_3$ is smaller than the capacitance $C_1$ shown in FIG. 3a. Please refer to FIG. 3d, when the conductive object 8 approaches (or contacts) the dielectric layer 121e, as the slits 122 are formed on the electrode layer 120, a capacitor of value $C_4 = \in_2 A_3/d$ is generated. Herein, as $A_3 < A_1$, the capacitance $C_4$ is smaller than the capacitance $C_2$ shown in FIG. 3b. In this manner, a larger range of the capacitance variation can be induced between the conductive object 8 and the electrode layer 120, such that it is able to increase resolution of the position identification.

It is appreciated that, although the dielectric layers 121 in FIG. 2 are shown as a square shape, the present invention is not limited to this. The dielectric layers 121 may be formed as different shapes, e.g. a rectangular shape, a circular shape, a diamond shape or non-canonical shapes.

Figure 4A:
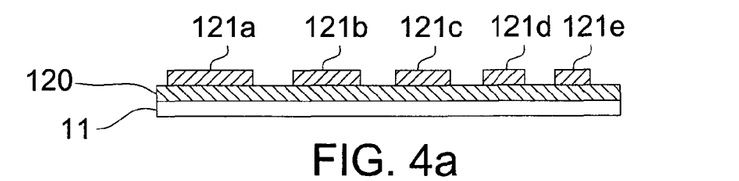
FIG. 4a shows a sectional view of the sensing unit taken along the line A-A' of FIG. 2.
Figure 4B:
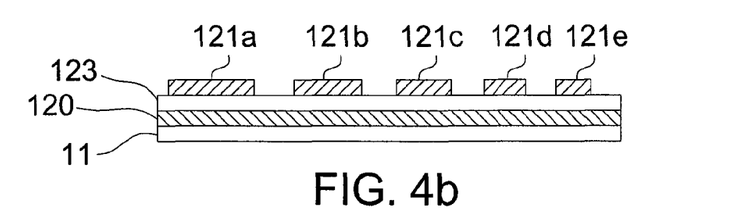
FIGS. 4b-4c show sectional views of the sensing unit taken along the line A-A' of FIG. 2.
Figure 4C:
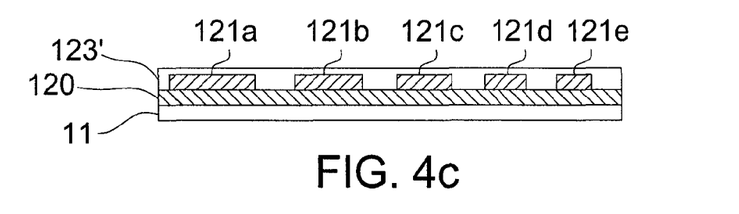

Please refer to FIGS. 4a-4c, they show sectional views of the sensing unit 12 taken along the line A-A' of FIG. 2, wherein no slit 122 is formed on the electrode layer 120. In FIG. 4a, the electrode layer 120 is formed on the substrate 11 and the dielectric layers 121a-121e are formed on the electrode layer 120. In another embodiment, the electrode layer 120 may further include a protective layer to protect the electrode layer 120 and/or the dielectric layer 121. For example in FIG. 4b, the sensing unit 12 further includes a protective layer 123 formed between the electrode layer 120 and the dielectric layers 121a-121e so as to protect the electrode layer 120, wherein the material of the protective layer 123 may be identical to or different from the dielectric layer 121. Please refer to FIG. 4c, a protective layer 123' covers over the electrode layer 120 and the dielectric layers 121a-121e so as to protect the electrode layer 120 and the dielectric layers 121a-121e. In this embodiment, a difference of dielectric constant between the dielectric layer 121 and the protective layer 123' is preferably at least larger than 4, such that the protective layer 123' does not significantly degrade the degree of capacitance variation on the electrode layer 120 when a conductive object approaches (or contacts) the electrode layer 120.

Figure 5A:
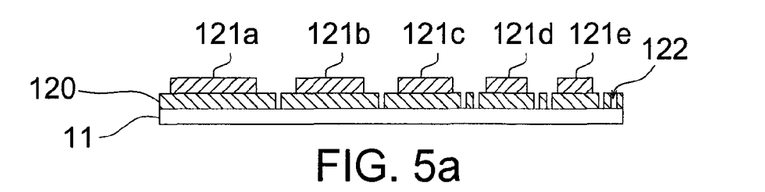
FIGS. 5a-5c show sectional views of the sensing unit taken along the line A-A' of FIG. 2, wherein the sensing unit includes a plurality of slits.
Figure 5B:
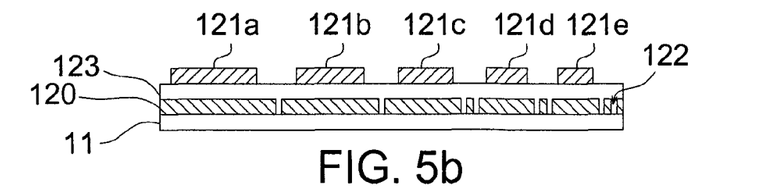
Figure 5C:
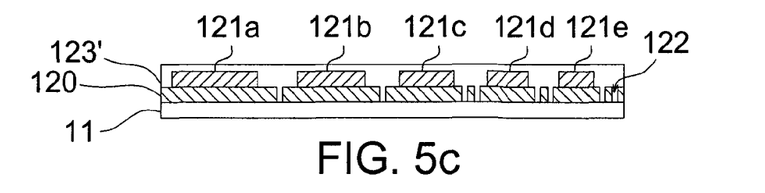

Please refer to FIGS. 5a-5c, they show other sectional views of the sensing unit 12 taken along the line A-A' of FIG. 2, where a plurality of slits 122 are formed on the electrode layer 120 herein. In FIG. 5a, the electrode layer 120 is formed on the substrate 11, the dielectric layers 121a-121e are formed on the electrode layer 120, and the slits 122 are formed on the electrode layer 120 surrounding the dielectric layers 121a-121e. In FIG. 5b, the sensing unit 12 further includes a protective layer 123 formed between the electrode layer 120 and the dielectric layers 121a-121e so as to protect the electrode layer 120. In FIG. 5c, a protective layer 123' covers over the electrode layer 120 and the dielectric layers 121a-121e so as to protect the electrode layer 120 and the dielectric layers 121a-121e.

Figure 6A:
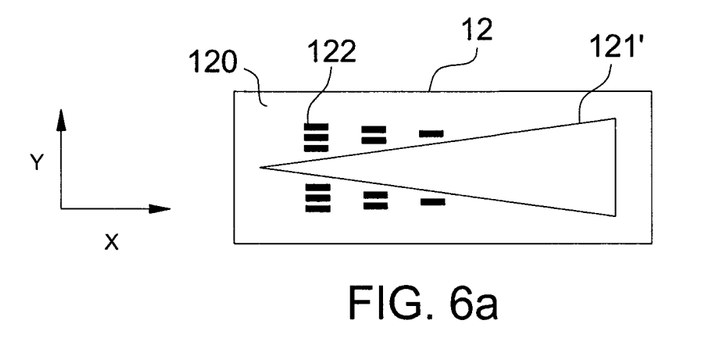
FIGS. 6a-6b show upper views of a sensing unit of the projective capacitive touch sensor according to an alternative embodiment of the present invention.
Figure 6B:
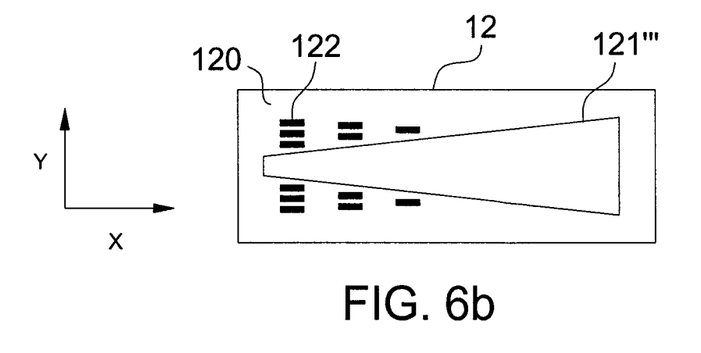

In a sensing unit 12 of the present invention, the dielectric layer 121 may not be formed as a plurality of separated dielectric layers 121a-121e as shown in FIG. 2 but be formed as a whole dielectric layer whose width changes along the first direction or the second direction. Please refer to FIGS. 6a-6b, they show upper views of the sensing unit 12 according to another embodiment of the present invention, wherein the width of the dielectric layers 121'-121" may change continuously along the second direction (for example X direction), e.g. monotonically increasing or decreasing. In an alternative embodiment, the width of the dielectric layers 121'-121" may change non-continuously along a direction. In addition, in order to increase resolution of the position identification, a plurality of slits 122 may further be formed outside the electric layers 121'-121" on each electrode layer 120, and more slits may be formed outside the section of dielectric layers 121'-121" with a smaller width as shown in FIGS. 6a-6b. It is appreciated that, FIGS. 6a-6b are only exemplary but not to limit the present invention.

Figure 7A:
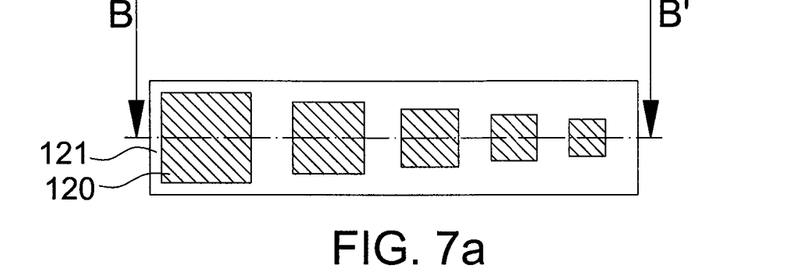
FIG. 7a shows an upper view of a sensing unit of the projective capacitive touch sensor according to an alternative embodiment of the present invention.
Figure 7B:
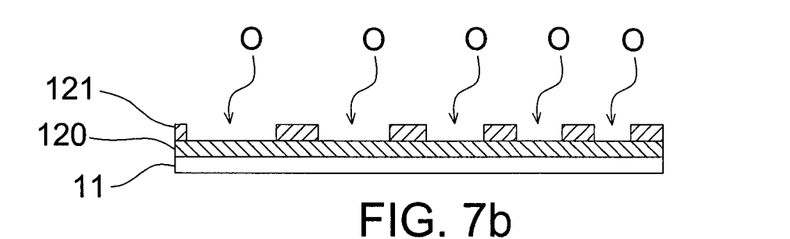
FIG. 7b shows a sectional view of the sensing unit taken along the line B-B' of FIG. 7a, wherein through openings with different areas are formed on the dielectric layer.
Figure 8A:
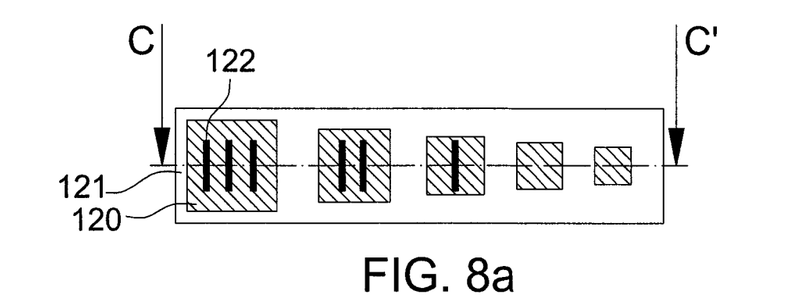
FIG. 8a shows an upper view of a sensing unit of the projective capacitive touch sensor according to an alternative embodiment of the present invention.
Figure 8B:
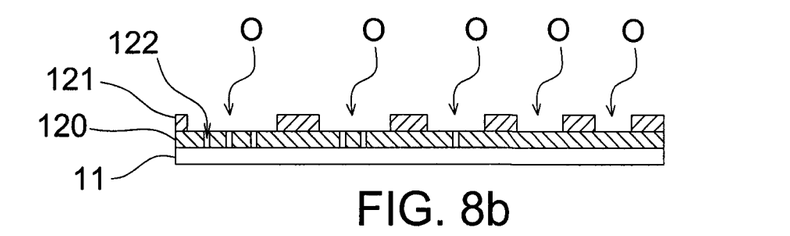
FIG. 8b shows a sectional view of the sensing unit taken along the line C-C' of FIG. 8a, wherein through openings with different areas are formed on the dielectric layer and slits are formed inside the through openings.

In an alternative embodiment, the dielectric layer 121 may be formed complementary to that shown in FIG. 2, i.e. the dielectric layer 121 formed on each electrode layer 120 may include through openings O with different areas along the second direction (e.g. X direction), such that the electrode layer 120 is exposed outside the dielectric layer through the through openings O. Areas of the through openings O within the dielectric layer 121 on each electrode layer 120 monotonically decrease or increase along the second direction. For example, FIG. 7a shows an upper view of the sensing unit 12 according to another embodiment of the present invention while FIG. 7b shows a sectional view taken alone the line B-B' of FIG. 7a, wherein the electrode layer 120 has no slit. By forming the through openings, when a conductive object approaches different positions of a sensing unit 12 along a direction (e.g. X direction), the processing unit 13 is able to detect different capacitance variations since a dielectric layer with different dielectric constants (an equivalent dielectric value of the air and the dielectric layer) exists between the conductive object and the electrode layer 120 along the direction. In addition, in order to increase resolution of the position identification, a plurality of slits 122 may further be formed inside the through openings O on each electrode layer 120, and more slits may be formed inside the through opening O with a larger area. For example, FIG. 8a shows an upper view of the sensing unit 12 according to another embodiment of the present invention while FIG. 8b shows a sectional view taken along the line C-C' of FIG. 8a, wherein the electrode layer 120 includes a plurality of slits 122.

It is appreciated that, although aforementioned descriptions disclose the embodiment of changing the area of the dielectric layers 121, the width of the dielectric layer 121 or the area of the through openings O in a second direction (e.g. X direction), but a person skilled in the art may implement this feature in a first direction (e.g. Y direction) or simultaneously in the first and second directions. It is appreciated that, the slits 122 are not limited to specific shapes.

It should be understood that, the structure of the projective capacitive touch sensor 1 is not limited to the above embodiments. The spirit of the present invention is to change a capacitance variation of the electrode layer induced by an approached conductive layer through changing an equivalent dielectric constant of the dielectric layer at different positions between the conductive object and the electrode layer. In addition, it is able to increase resolution of the position identification by changing the relative area (i.e. forming slits) between the electrode layer and the conductive object.

As mentioned above, as conventional projective capacitive touch screens have multilayer sensor array structure to increase the manufacturing complexity, the present invention provides a projective capacitive touch sensor (FIG. 2) that has a single layer of sensing units thereby having simpler manufacturing process.

Although the invention has been explained in relation to its preferred embodiment, the present invention is not limited to this. It is to be understood that many other possible modifications and variations can be made by those skilled in the art without departing from the spirit and scope of the invention as hereinafter claimed.

What is claimed is:

1. A projective capacitive touch sensor, configured to detect a conductive object approaching thereto, the projective capacitive touch sensor comprising:
    a substrate;
    a plurality of electrode layers arranged on the substrate along a first direction;
    a plurality of dielectric layers formed on each of the electrode layers; and
    a plurality of slits formed on each of the electrode layers and surrounding the dielectric layers on said electrode layer,
    wherein the dielectric layers formed on each of the electrode layers have different areas along a second direction and are configured to form different equivalent dielectric constants for inducing different capacitance variations between the conductive object and the electrode layer, and
    wherein, among the dielectric layers on each of the electrode layers, a dielectric layer with a smaller area is surrounded by more slits.

2. The projective capacitive touch sensor as claimed in claim 1, further comprising:
    a plurality of conductive traces respectively coupled to the electrode layers; and
    a processing unit coupled to all of the electrode layers through the conductive traces and configured to identify a position of the conductive object with respect to the touch sensor along the first and second directions according to the capacitance variations between the conductive object and the electrode layers.

3. The projective capacitive touch sensor as claimed in claim 1, further comprising a protective layer covering the electrode layers and the corresponding dielectric layers, wherein a dielectric constant difference between the protective layer and the dielectric layers is larger than 4.

4. The projective capacitive touch sensor as claimed in claim 1, wherein each of the electrode layers has a constant width along the second direction.

5. The projective capacitive touch sensor as claimed in claim 1, wherein areas of the plurality of dielectric layers formed on each of the electrode layers are monotonically decreasing or increasing along the second direction.

6. A projective capacitive touch sensor, configured to detect a conductive object approaching thereto, the projective capacitive touch sensor comprising:
a substrate;
a plurality of electrode layers arranged on the substrate along a first direction;
a plurality of dielectric layers formed on each of the electrode layers; and
a plurality of slits formed on each of the electrode layers and outside the dielectric layers on said electrode layer,
wherein the dielectric layers formed on each of the electrode layers have different widths along a second direction and are configured to form different equivalent dielectric constants for inducing different capacitance variations between the conductive object and the electrode layers, and
wherein, among the dielectric layers on each of the electrode layers, a dielectric layer with a smaller area is surrounded by more slits.

7. The projective capacitive touch sensor as claimed in claim 6, further comprising:
a plurality of conductive traces respectively coupled to the electrode layers; and
a processing unit coupled to all of the electrode layers through the conductive traces and configured to identify a position of the conductive object with respect to the touch sensor along the first and second directions according to the capacitance variations between the conductive object and the electrode layers.

8. The projective capacitive touch sensor as claimed in claim 6, further comprising a protective layer covering the electrode layers and the corresponding dielectric layers, wherein a dielectric constant difference between the protective layer and the dielectric layers is larger than 4.

9. The projective capacitive touch sensor as claimed in claim 6, wherein each of the electrode layers has a constant width along the second direction.

10. The projective capacitive touch sensor as claimed in claim 6, wherein widths of the dielectric layers formed on each of the electrode layers are monotonically decreasing or increasing along the second direction.

11. A projective capacitive touch sensor, configured to detect a conductive object approaching thereto, the projective capacitive touch sensor comprising:
a substrate;
a plurality of electrode layers arranged on the substrate along a first direction;
a plurality of dielectric layers each of which is formed on one of the electrode layers; and
a plurality of slits formed on each of the electrode layers inside the through openings,
wherein the dielectric layer formed on each of the electrode layers includes through openings with different areas along a second direction and is configured to form different equivalent dielectric constants for inducing different capacitance variations between the conductive object and the electrode layers, and
wherein, among the through openings of the dielectric layer on each of the electrode layers, more slits are formed inside a through opening with a larger area.

12. The projective capacitive touch sensor as claimed in claim 11, further comprising:
a plurality of conductive traces respectively coupled to the electrode layers; and
a processing unit coupled to all electrode layers through the conductive traces and configured to identify a position of the conductive object with respect to the touch sensor along the first and second directions according to the capacitance variations between the conductive object and the electrode layers.

13. The projective capacitive touch sensor as claimed in claim 11, further comprising a protective layer covering each of the electrode layers and the corresponding dielectric layer, wherein a dielectric constant difference between the protective layer and the dielectric layer is larger than 4.

14. The projective capacitive touch sensor as claimed in claim 11, wherein each of the electrode layers has a constant width along the second direction.

15. The projective capacitive touch sensor as claimed in claim 11, wherein areas of the through openings of the dielectric layer formed on each of the electrode layers are monotonically decreasing or increasing along the second direction.

* * * * *